US007031751B2

(12) United States Patent
Hurler et al.

(10) Patent No.: US 7,031,751 B2
(45) Date of Patent: Apr. 18, 2006

(54) CONTROL DEVICE FOR ADJUSTING A DIFFERENT SLOPE ANGLE, ESPECIALLY OF A MOBILE RADIO ANTENNA ASSOCIATED WITH A BASE STATION, AND CORRESPONDING ANTENNA AND CORRESPONDING METHOD FOR MODIFYING THE SLOPE ANGLE

(75) Inventors: Marcus Hurler, Brannenburg (DE); Carolin Erl, Rosenheim (DE); Roland Gabriel, Griestätt (DE); Max Göttl, Frasdorf (DE)

(73) Assignee: Kathrein-Werke KG, Rosenheim (DE)

( * ) Notice: Subject to any disclaimer, the term of this patent is extended or adjusted under 35 U.S.C. 154(b) by 556 days.

(21) Appl. No.: 10/240,317

(22) PCT Filed: Jan. 31, 2002

(86) PCT No.: PCT/EP02/01008

§ 371 (c)(1), (2), (4) Date: Oct. 17, 2002

(87) PCT Pub. No.: WO02/061877

PCT Pub. Date: Aug. 8, 2002

(65) Prior Publication Data

US 2003/0109231 A1 Jun. 12, 2003

(51) Int. Cl.
*H04B 1/38* (2006.01)

(52) U.S. Cl. ................. 455/557; 455/562.1; 455/575.1; 455/561

(58) Field of Classification Search .............. 455/562.1, 455/575.1, 561; 343/853, 757, 763; 342/359, 342/74

See application file for complete search history.

(56) References Cited

U.S. PATENT DOCUMENTS

| | | |
|---|---|---|
| 1,764,441 A | 6/1930 | Hahnemann |
| 1,806,755 A | 5/1931 | Hansell |

(Continued)

FOREIGN PATENT DOCUMENTS

| | | |
|---|---|---|
| AU | 933874 | 5/1993 |
| AU | 9341625 | 6/1993 |

(Continued)

OTHER PUBLICATIONS

Strickland, "Microstrip Base Station Antennas for Cellular Communications" *Proceedings*, pp. 166–169 (IEEE CH2944 1991).

Faruque, "Cellular Control Channel Capacity: Evaluation and Enhancement," pp. 400–404 (IEEE 1992).

"Electrically Tilted Panel Antennas," IMCE Engineering Meeting, Anaheim, pp. 1–10 (Mar. 25, 1993).

"Second Generation Variable Electrical Tilt Panel Antenna," CTIA Technical Meeting, San Diego, pp. 1–10 (Mar. 1–4, 1994).

(Continued)

*Primary Examiner*—Erika A. Gary
*Assistant Examiner*—Wayne Cai
(74) *Attorney, Agent, or Firm*—Nixon & Vanderhye P.C.

(57) ABSTRACT

An improved antenna control apparatus as well as an associated antenna and a method which has been improved in this context are distinguished by the following features:

the control apparatus (13) has control electronics (41), the control apparatus (13) furthermore has an electric motor (51), an antenna control apparatus can be retrofitted outside the protective cover for the mobile radio antennas, or else as a preferably complete unit underneath this protective cover.

13 Claims, 4 Drawing Sheets

U.S. PATENT DOCUMENTS 2,041,600 A 5/1936 Friis
2,245,660 A 6/1941 Feldman et al.
2,247,666 A 7/1941 Potter
2,248,335 A 7/1941 Burkhart
2,272,431 A 2/1942 Rankin
2,300,576 A 11/1942 Klein
2,432,134 A 12/1947 Bagnall
2,462,881 A 3/1949 Marchetti
2,496,920 A 2/1950 Seeley
2,535,850 A 12/1950 Hammond
2,540,696 A 2/1951 Smith, Jr.
2,565,334 A 8/1951 Wingarden
2,566,897 A 9/1951 Koenig
2,583,747 A 1/1952 Potter
2,594,115 A 4/1952 Berney
2,596,966 A 5/1952 Lindsay, Jr.
2,597,424 A 5/1952 Znaidukas
2,599,048 A 6/1952 Dicke
2,605,413 A 7/1952 Alvarez
2,642,567 A 6/1953 Kimball et al.
2,648,000 A 8/1953 White
2,668,920 A 2/1954 Barrett
2,711,527 A 6/1955 Barrett
2,736,854 A 2/1956 Will
2,745,994 A 5/1956 Dicke et al.
2,773,254 A 12/1956 Engelmann
2,787,169 A 4/1957 Farr et al.
2,789,190 A 4/1957 Statham
2,794,162 A 5/1957 Lifsey
2,797,374 A 6/1957 Atton et al.
2,815,501 A 12/1957 Benson et al.
2,825,240 A 3/1958 Gray
2,830,292 A 4/1958 Young
2,831,169 A 4/1958 Casal
2,836,814 A 5/1958 Nail
2,851,620 A 9/1958 Hausen
2,861,235 A 11/1958 Chadowski et al.
2,872,631 A 2/1959 Blauvelt et al.
2,900,154 A 8/1959 Schweim
2,922,941 A 1/1960 Hensler et al.
2,939,335 A 6/1960 Braund et al.
2,968,808 A 1/1961 Russell
3,005,985 A 10/1961 Cohn et al.
3,008,140 A 11/1961 Rose
3,032,759 A 5/1962 Ashby
3,032,763 A 5/1962 Sletten
3,043,998 A 7/1962 Lunn et al.
3,205,419 A 9/1965 Voigt
3,248,736 A 4/1966 Bohar
3,276,018 A 9/1966 Butler
3,277,481 A 10/1966 Robin et al.
3,316,469 A 4/1967 Dicke
3,438,035 A 4/1969 Fling et al.
3,491,363 A 1/1970 Young, Jr.
3,508,274 A 4/1970 Kesler et al.
3,527,993 A 9/1970 Ticknor
3,728,733 A 4/1973 Robinson
3,826,964 A 7/1974 Byrne
3,864,689 A 2/1975 Young
3,886,559 A 5/1975 Lanson et al.
3,886,560 A 5/1975 Mortensen et al.
3,969,729 A 7/1976 Nemit
4,077,000 A 2/1978 Grubbs
4,101,902 A 7/1978 Trigon
4,129,872 A 12/1978 Toman
4,163,235 A 7/1979 Schultz
4,241,352 A 12/1980 Alspaugh et al.
4,263,539 A 4/1981 Barton
4,301,397 A 11/1981 Journey
4,314,250 A 2/1982 Hanell et al.
4,316,195 A 2/1982 Steffek et al.
4,335,388 A 6/1982 Scott et al.
4,413,263 A 11/1983 Amitay et al.
4,427,984 A 1/1984 Anderson
4,446,463 A 5/1984 Irzinski
4,460,897 A 7/1984 Gans
4,467,328 A 8/1984 Hacker
4,496,890 A 1/1985 Wurdack et al.
4,532,518 A 7/1985 Gaglione et al.
4,542,326 A 9/1985 Hornback
4,543,583 A 9/1985 Wurdack
4,564,824 A 1/1986 Boyd, Jr.
4,570,134 A 2/1986 Woodward
4,575,697 A 3/1986 Rao et al.
4,602,227 A 7/1986 Clark et al.
4,616,195 A 10/1986 Ward et al.
4,617,572 A 10/1986 Hugo
4,635,062 A 1/1987 Bierig et al.
4,652,887 A 3/1987 Cresswell
4,694,773 A 9/1987 Sparkes et al.
4,714,930 A 12/1987 Winter et al.
4,717,918 A 1/1988 Finken
4,755,778 A 7/1988 Chapell
4,768,001 A 8/1988 Chan-Son-Lint et al.
4,788,515 A 11/1988 Wong et al.
4,791,428 A 12/1988 Anderson
4,796,032 A 1/1989 Sakurai et al.
4,804,899 A 2/1989 Wurdack et al.
4,814,774 A 3/1989 Herczfeld
4,821,596 A 4/1989 Eklund
4,843,355 A 6/1989 Knorr
4,849,763 A 7/1989 DuFort
4,862,179 A 8/1989 Yamada
4,882,587 A 11/1989 Vodopia
5,012,256 A 4/1991 Maddocks
5,021,798 A 6/1991 Ubhayakar
5,038,148 A 8/1991 Aoki et al.
5,077,560 A 12/1991 Horton et al.
5,084,708 A 1/1992 Champeau et al.
5,093,923 A 3/1992 Leslie
5,099,247 A 3/1992 Basile et al.
5,151,704 A 9/1992 Gunmar et al.
5,151,706 A 9/1992 Roederer et al.
5,162,803 A 11/1992 Chen
5,175,556 A 12/1992 Berkowitz
5,181,042 A 1/1993 Kaise et al.
5,184,140 A 2/1993 Hariu et al.
5,214,364 A 5/1993 Perdue et al.
5,241,319 A 8/1993 Shimizu
5,272,477 A 12/1993 Tashima et al.
5,281,974 A 1/1994 Kuramoto et al.
5,281,975 A 1/1994 Hugo
5,300,935 A 4/1994 Yu
5,303,240 A 4/1994 Borras et al.
5,339,083 A 8/1994 Inami
5,440,318 A 8/1995 Butland et al.
5,488,737 A 1/1996 Harbin et al.
5,504,466 A 4/1996 Chan-Son-Lint et al.
5,504,937 A 4/1996 Kangas
5,512,914 A 4/1996 Hadzoglou et al.
5,539,413 A 7/1996 Farrell et al.
5,551,060 A 8/1996 Fujii et al.
5,572,219 A 11/1996 Silverstein et al.
5,596,329 A 1/1997 Searle et al.
5,724,593 A 3/1998 Hargrave, III et al.
5,798,675 A 8/1998 Drach
5,801,600 A 9/1998 Butland et al.
5,805,996 A 9/1998 Salmela
5,818,385 A 10/1998 Bartholomew
5,905,462 A 5/1999 Hampel et al.
5,917,455 A 6/1999 Huynh

| | | | | |
|---|---|---|---|---|
| 5,983,071 | A | 11/1999 | Gagnon et al. | |
| 6,078,824 | A | 6/2000 | Sogo | |
| 6,131,082 | A | 10/2000 | Hargrave, III et al. | |
| 6,188,373 | B1 | 2/2001 | Martek | |
| 6,198,458 | B1 * | 3/2001 | Heinz et al. | 343/853 |
| 6,239,744 | B1 * | 5/2001 | Singer et al. | 342/359 |
| 6,278,969 | B1 | 8/2001 | King et al. | |
| 6,345,243 | B1 | 2/2002 | Clark | |
| 6,346,924 | B1 | 2/2002 | Heinz et al. | |
| 6,366,237 | B1 | 4/2002 | Charles | |
| 6,538,619 | B1 | 3/2003 | Heinz et al. | |
| 6,567,051 | B1 | 5/2003 | Heinz et al. | |
| 6,590,546 | B1 | 7/2003 | Heinz et al. | |
| 6,600,457 | B1 | 7/2003 | Heinz et al. | |
| 2002/0113750 | A1 | 8/2002 | Heinz et al. | |
| 2002/0126059 | A1 | 9/2002 | Zimmerman et al. | |
| 2002/0135530 | A1 | 9/2002 | Heinz et al. | |
| 2002/0140619 | A1 | 10/2002 | Heinz et al. | |
| 2002/0149528 | A1 | 10/2002 | Heinz et al. | |
| 2002/0186172 | A1 | 12/2002 | Heinz et al. | |
| 2003/0048230 | A1 | 3/2003 | Heinz et al. | |

FOREIGN PATENT DOCUMENTS

| | | | |
|---|---|---|---|
| AU | B 38746/93 | | 7/1993 |
| AU | B 41625/93 | | 1/1994 |
| AU | 9480057 | | 10/1994 |
| AU | 80057/94 | | 5/1995 |
| AU | B-36226/95 | | 5/1998 |
| CH | 2 75 290 | A | 8/1951 |
| DE | 584 383 | | 9/1933 |
| DE | 827 085 | B | 1/1952 |
| DE | 907 193 | B | 3/1954 |
| DE | 908 748 | | 4/1954 |
| DE | 945 261 | | 7/1956 |
| DE | 1 768 660 | | 6/1958 |
| DE | 1 033 280 | | 7/1958 |
| DE | 1 826 656 | | 2/1961 |
| DE | 1 133 775 | | 7/1962 |
| DE | 1 293 251 | | 4/1964 |
| DE | 2 249 806 | | 4/1973 |
| DE | 2 207 894 | | 8/1973 |
| DE | 2 359 846 | | 6/1974 |
| DE | 26 25 062 | A1 | 12/1977 |
| DE | 26 31 273 | | 1/1978 |
| DE | 24 58 477 | | 5/1978 |
| DE | 2737714 | | 3/1979 |
| DE | 29 21 712 | | 12/1979 |
| DE | 29 38 370 | | 4/1980 |
| DE | 28 55 623 | A1 | 7/1980 |
| DE | 29 51 875 | C2 | 7/1980 |
| DE | 31 34 219 | A1 | 3/1983 |
| DE | 3322-986 | A | 6/1983 |
| DE | 34 25 351 | C2 | 1/1985 |
| DE | 33233234 | A1 | 1/1985 |
| DE | 35 22 404 | A1 | 1/1987 |
| DE | 38 31 994 A 1 | | 3/1990 |
| DE | 38 39 945 | A1 | 5/1990 |
| DE | 3902739 | | 8/1990 |
| DE | 39 02 739 | A1 | 8/1990 |
| DE | 39 34 716 | A1 | 4/1991 |
| DE | 39 37 294 | A1 | 5/1991 |
| DE | G 91 08 641.8 | | 10/1991 |
| DE | 31 02 110 | A1 | 8/1992 |
| DE | 42 01 933 | C2 | 7/1993 |
| DE | 42 42 803 | A1 | 7/1993 |
| EP | 0106438 | | 4/1984 |
| EP | 0137562 | A2 | 4/1985 |
| EP | 0 156 294 | | 10/1985 |
| EP | 0241153 | A2 | 6/1987 |
| EP | 0357085 | | 3/1990 |
| EP | 0357165 | A2 | 3/1990 |
| EP | 0398637 | A2 | 11/1990 |
| EP | 0423512 | A2 | 4/1991 |
| EP | 0 466 080 | A1 | 1/1992 |
| EP | 0 575 808 | A1 | 12/1993 |
| EP | 0 579 407 | B1 | 1/1994 |
| EP | 0588179 | A1 | 3/1994 |
| EP | 0618639 | | 3/1994 |
| EP | 0595726 | A1 | 5/1994 |
| EP | 0310661 | B1 | 6/1994 |
| EP | 0 600 715 | B1 | 9/1994 |
| EP | 0 616 741 | B1 | 9/1994 |
| EP | 0 639 035 | A1 | 2/1995 |
| EP | 0 682 820 | B | 11/1995 |
| EP | 789 938 | A1 | 8/1997 |
| EP | 789 938 | A4 | 4/1999 |
| EP | 1 026 778 | A2 | 8/2000 |
| EP | 1 032 074 | A1 | 8/2000 |
| EP | 1 067 626 | | 1/2001 |
| EP | 1 239 534 | A2 | 9/2002 |
| EP | 1 239 535 | A2 | 9/2002 |
| EP | 1 239 536 | A2 | 9/2002 |
| EP | 1 239 538 | A2 | 9/2002 |
| FR | 959833 | | 4/1950 |
| FR | 70.39506 | | 8/1971 |
| FR | 2 581 255 | A1 | 10/1986 |
| FR | 2581255 | A1 | 10/1986 |
| FR | 2 603 426 | | 3/1988 |
| GB | 1 044 789 | | 11/1963 |
| GB | 1 029 865 | | 5/1966 |
| GB | 1 175 365 | A | 12/1969 |
| GB | 1 271 346 | A | 4/1972 |
| GB | 1 314 693 | | 4/1973 |
| GB | 1 470 884 | A | 4/1977 |
| GB | 1 505 074 | A | 3/1978 |
| GB | 2035700 | A | 12/1979 |
| GB | 2 034 525 | A | 6/1980 |
| GB | 1 577 939 | A | 10/1980 |
| GB | 2 044 567 | A | 10/1980 |
| GB | 2158996 | A | 1/1983 |
| GB | 2 115 984 | | 8/1983 |
| GB | 2165397 | A | 9/1983 |
| GB | 2 158 997 | | 4/1985 |
| GB | 2159333 | A | 11/1985 |
| GB | 2 161 026 | A | 1/1986 |
| GB | 2196484 | A | 4/1988 |
| GB | 2205946 | | 12/1988 |
| GB | 2232536 | A | 8/1991 |
| GB | 2 262 009 | A | 6/1993 |
| JP | 57-184303 | | 11/1982 |
| JP | 59-90401 | | 5/1984 |
| JP | 61-172411 | | 8/1986 |
| JP | 63-6906 | | 1/1988 |
| JP | 1120906 | A | 5/1989 |
| JP | 1-140802 | | 6/1989 |
| JP | 2121504 | A | 5/1990 |
| JP | 02 132 926 | | 5/1990 |
| JP | 2174402 | A | 7/1990 |
| JP | 2290306 | A | 11/1990 |
| JP | 7-79476 | | 3/1991 |
| JP | 03 057 305 | A | 3/1991 |
| JP | 3-85906 | | 4/1991 |
| JP | 3-151701 | | 6/1991 |
| JP | 4-144518/18 | | 2/1992 |
| JP | 4-2014705/25 | | 5/1992 |
| JP | 4-196904 | | 7/1992 |
| JP | 4-286407 | | 10/1992 |
| JP | 4286407 | A | 10/1992 |
| JP | 5-37222 | | 2/1993 |
| JP | 3-279795 | | 5/1993 |
| JP | 5-121902 | | 5/1993 |
| JP | 5121915 | A | 5/1993 |

| | | | |
|---|---|---|---|
| JP | 5-131915 | | 5/1993 |
| JP | 5191129 | A | 7/1993 |
| JP | 6-125216 | | 5/1994 |
| JP | 6196927 | A | 7/1994 |
| JP | 6-204738 | | 7/1994 |
| JP | 6-232621 | | 8/1994 |
| JP | 6-268428 | | 9/1994 |
| JP | 5-110283 | | 11/1994 |
| JP | 5-110284 | | 11/1994 |
| JP | 06-326 501 | | 11/1994 |
| JP | 06-326 502 | | 11/1994 |
| JP | 06 334 428 | | 12/1994 |
| JP | 6-338717 | | 12/1994 |
| JP | 7-170121 | | 7/1995 |
| JP | 07-245579 | | 9/1995 |
| JP | 7-318627 | | 12/1995 |
| JP | 8-32341 | | 2/1996 |
| JP | 8-172388 | | 7/1996 |
| JP | 9-246846 | | 9/1997 |
| JP | 10-508730 | | 8/1998 |
| NZ | 204522 | | 1/1986 |
| NZ | 208213 | | 10/1987 |
| NZ | 219746 | | 8/1989 |
| NZ | 220276 | | 9/1989 |
| NZ | 24897 | | 10/1993 |
| NZ | 235010 | | 12/1993 |
| NZ | 264864 | | 11/1994 |
| NZ | 272778 | | 8/1995 |
| NZ | 248075 | | 3/1996 |
| NZ | 274931 | | 10/1996 |
| NZ | 293722 | | 5/1997 |
| NZ | 334357 | | 4/1999 |
| NZ | 333811 | | 4/2000 |
| NZ | 333634 | | 10/2000 |
| RU | 93-125240/15 | | 5/1992 |
| SU | 1 337 951 | | 9/1987 |
| WO | WO88/00862 | A1 | 5/1989 |
| WO | WO 90/14563 | | 11/1990 |
| WO | WO 92/16061 | A1 | 9/1992 |
| WO | WO 93/12587 | | 6/1993 |
| WO | WO 94/09568 | A1 | 4/1994 |
| WO | WO95/10862 | | 4/1995 |
| WO | 96/14670 | | 5/1996 |
| WO | 96/37009 | | 11/1996 |
| WO | 96/37922 | | 11/1996 |
| WO | 98/21779 | | 5/1998 |
| WO | 98/42042 | | 9/1998 |
| WO | WO 02/061877 | | 8/2002 |

OTHER PUBLICATIONS

"Ongoing Development of Electrically Tilted Panels," MTS Engineering Meeting, Dallas (Mar. 25–28, 1996).

Benner, "Effects of Antenna Height, Antenna Gain, and Pattern Downtilting for Cellular Mobile Radio," IEEE Transactions on Vehicular Technology, vol. 45, No. 2 (May 1996).

Arowojulu et al., "Controlling the Coverage Area of a Microcell," University of Liverpool, UK, pp. 72–75 (1993).

"Cellular Panel Antenna," Radio Frequency Systems Pty. Limited, Doc. No. 26900E000, Issue 1, 6 pages.

Press release, "Announcing the PerforMax™ Dual Polarized Wideband Variable Electrical Downtilt Antenna for 3G Rollouts," Orlando Park, IL (Andrew Corp. Aug. 6, 2001).

New product announcement, "PerforMax™ Dual Polarized wideband variable electrical downtilt antenna for 3G rollouts," (Andrew Corp. 2001).

Press release, Andrew Corp., "Andrews Acquires Deltecs Teletilt™ Business," Orlando Park, IL (Jul. 20, 2001).

Press release, Andrew Corp., "Andrew and Argus Announce Licensing Agreement," Orlando Park, IL (Oct. 19, 2001).

Wilson, "Electrical Downtilt Through Beam–Steering Versus Mechanical Downtilt," Vehicular Technology Society 42nd VTS Conference Frontiers of Technology, vol. 1 of 2, pp. 1–4 (May 18, 1992).

Yamada, "Base and Mobile Station Antennas for Land Mobile Radio Systems," IEICE Transactions, vol. E 74, No. 6 (Jun. 1991).

Lovis, "Aufbau Und Strahlungseigenschaften Einer Elektronisch Gesteuerten Sekundarradarantenne," (NTG Technical Reports vol. 57, Papers of the NTG Conference (Mar. 8 to 11, 1977 Bad Neiheim) with translation.

Specifications: Mobile Telephone and Panel Array (MPTA) Antenna, VARITILT Continuously Variable Electrical Downtilt Models; Deltec New Zealand Limited.

Heath, B., "Design Specification for Premium Antenna with EDT and AS" (1993).

Friis, *The Bell System Technical Journal*, XXVI:218–316, "Radar Antennas" (1947).

Bacon, G.E., "Variable–Elevation Beam–Arial Systems for 1 1/2 Metres," *Journal I.E.E.*, 93:539–544 (1946).

Kummer, W.H., "Electromechanical Devices," *Microwave Scanning Antennas*, III:48–130.

Mills et al., "The Sydney University Cross–type Radio Telescope," *Proceedings of the I.R.E. Australia*, pp 156–165 (1963).

Yamada et al., "Low Sidelobe and Tilted Beam Base–Station Antennas for Smaller–Cell Systems," NTT Radio Radio-Communication Systems Laboratories and Nipon Telegraph and Telephone Corporation.

Mobile Telephone Panel Array Antenna—MTP890–8–E.

Mobile Telephone Panel Array Antenna—MTP890–4–E.

Mobile Telephone Panel Array Antenna—MTP890–8–EF.

"Design Specification for Premium antenna with EDT and AS" Telecom Australia Sep. 1993.

Kumar Fixed and mobile terminal antennas 1991 Artech House, Inc.

Publication "Phased array antennas" p. 219–220 Cheston "Beam Steering of Planar Phase Arrays," Dedham, MA (1972).

News of higher education establishments, Radio electronics. Technical–scientific journal Higher Education Ministry of USSR, Kiev, 1985–1991.

Measuring Technique. Monthly scientific–technical journal. State Committee of USSR on standards. Moscow, Standards publishing house, 1985–1990.

Radio. Popular monthly radio technical magazine. Moscow, 1987–1996.

Radio Technic. Scientific–technical journal. Popov Radio Technic, Electronics and Communication Socient. Moscow, publishing house "Radioand Communications," 1985–1995.

Radio Engineering and Electronics. Academy of Sciences of USSR, Moscow, "Nauka," 1985–1995.

Electric Communication. Monthly scientific–technical journal. Communication Ministry of USSR and Popov Radio-Technic. Electronics and Communication Society. Moscow, publishing house "Radio and Communications," 1987–1995.

Monthly scientific–technical journal. Electrical Engineering Ministry and Krzyzanovski Center. Moscow, "Energoatomizdat," 1985–1995.

Phased Antenna array, M.B. Zakson, Great Soviet Encyclopedia, 3rd edition, Moscow. Sovetskaya Entsiklopediya, 1977, vol. 27, Ulyanovsk–Frankfurt, p. 182–185.
Phased Antenna arrays, Antennas. A.L. Drabkin, Ye. B. Korenberg. Moscow, "Radio I svyaz." 1992 (Popular library, issue 1173), Chapter 9 "Antenna arrays," pp. 109–114.
Antenna arrays with phase scanning. Antennas of radiolocation stations. V.G. Glagolevski, Yu. A. Shishov. Moscow, "Voyenizdat," 1977. –n Chapter [2]: Antenna arrays, pp. 44–48. Radiolocation technique.
Phased Antenna arrays. Antennas. Manual for students of radio engineering higher educational establishments, G.T. Markow, D.M. Sazonov, 2nd edition. Moscow, "Energiya," 1975. Chapter 14 "Scanning Antenna arrays," pp. 462–468.
Kumm et al, Phasengesteuerte Planarantennengruppen fur den Empfangsbereich um 12 Gigahertz (1983).
Heath, B., "Design Specification for Premium Antenna with EDT and AS" (1993).
Friis, The Bell System Technical Journal, XXVI:218–316, "Radar Antennas" (1947).
Bacon, G.E., "Variable–Elevation Beam–Arial–Systems for 1 1/2 Metres," Journal I.E.E., 93:539–544 (1946).
Kummer, W.H., "Electromechanical Devices," Microwave Scanning Antennas, III:48–130.
Mills et al., "The Sydney University Cross–type Radio Telescope," Proceedings of the I.R.E. Australia, pp 156–165 (1963).
Japanese Book "Antenna for Broadcasting and radio wave transmission" Apr. 20, 1973 by NHK (Nihon Hoso Kyokai.
Japanese Book "Illustrated mobile communication antenna system" Oct. 10, 1996 by Fujimoto.
Japanese Book "Antenna Engineering" Sep. 30, 1969 Endo et al.
Product information sheet, "Mobile Telephone Panel Array (MTPA) Antenna: VARITILT continuously Variable Electrical Downtilt Models," Australia Sep. 1994.
Mobile Telephone Panel Array (MPTA) Antenna : Field Adjustable Downtilt Models Australia May 1994.

* cited by examiner

CONTROL DEVICE FOR ADJUSTING A DIFFERENT SLOPE ANGLE, ESPECIALLY OF A MOBILE RADIO ANTENNA ASSOCIATED WITH A BASE STATION, AND CORRESPONDING ANTENNA AND CORRESPONDING METHOD FOR MODIFYING THE SLOPE ANGLE

This application is related to applicants' co-pending application Ser. No. 10/049,809 filed Feb. 19,2002.

The invention relates to a control apparatus for setting a different depression angle in particular for a mobile radio antenna which is part of a base station, as claimed in the precharacterizing clause of claim 1, and to an associated antenna and a method for changing the depression angle.

As is known, mobile radio networks are in cellular form, with each cell having a corresponding associated base station with at least one mobile radio antenna for transmitting and receiving. The antennas are in this case designed such that they generally transmit with a downward deflection at a specific angle below the horizontal, thus defining a specific cell size.

In addition to the main transmission frequencies in the 900 MHz band and in the 1800 MHz band (for example the 1900 MHz band in the USA), the 2000 MHz band will become important for the next mobile radio network generation, the so-called UMTS network. The antennas must be set to different inclination angles as a function of the size of the individual cell which is covered by a base station as well as, for example, as a function of the relevant network (for example the anticipated UMTS network).

Finally, it is also known for the depression or inclination angle, which is also referred to in places as the downtilt angle in the following text, at which a mobile radio antenna of a base station transmits downward with respect to the horizontal, to be adjustable, for example by means of phase shifters The inclination angle of the polar diagram is changed by varying the phase difference between a number of individual radiating elements arranged one above the other. The phase shifters may be set appropriately for this purpose, which normally requires the adjustment process to be carried out manually directly on the mobile radio antenna. Furthermore, the protection devices which are fitted must also be removed and refitted. This is, of course, associated with a considerable amount of installation effort.

Against this background, WO 96/14670 has also already proposed the capability to adjust the downtilt angle differently by means of an electrical control device, in which case the controller for such a control device can be mounted, for example, in the base of such an antenna device and can be used as a mobile control device and can be connected as required via a plug connection to control lines which are passed out of the antenna, in order to operate the adjustment device, which is installed underneath the protective housing, in order to adjust the downtilt angle.

Antennas with differently adjustable depression angles are in principle also known from U.S. Pat. No. 5,512,914. In this case, U.S. Pat. No. 6,078,824 furthermore discloses an electromagnetic circuit device for carrying out the process of depressing the beam angle.

The object of the present invention is thus to provide an improved method and an improved control apparatus for changing the downtilt angle, and hence, in the end, a base station, with a mobile radio antenna, which is improved overall.

The antenna control apparatus according to the invention is distinguished in that it can be mounted, such that it can be retrofitted, on a corresponding mobile radio base station outside the protective housing for the radiating elements (radom).

There is thus preferably no need to have to provide the already extensive mechanical and/or electronic devices during the production or delivery of a corresponding mobile radio antenna, in order to ensure that it can be retrofitted.

In principle, manual adjustment from the outside is prior art. The control apparatus according to the invention is, in comparison to this, preferably distinguished in that, when fitted outside the protective housing of the antenna, it interacts with only that control element via which the adjustment can otherwise be carried out manually.

The antenna, which will be described in detail with reference to exemplary embodiments, uses, in this case, a fundamentally known transmission element, which can be operated manually from outside the antenna protective cover, and which passes through an appropriate opening into the interior underneath the protective housing for the antenna, in order there to operate the one or more phase shifters for adjustment of the downtilt angle, for example via a transmission linkage. This operating element which passes from the outside to the inside through the protective housing, or through a part of the rear plate or side plate of the supporting and/or protective cover for the antenna, preferably comprises a spindle which is guided in an appropriate threaded sleeve such that it can rotate. The threaded spindle can thus be moved in the axial direction between two limit or extreme positions by rotating it.

The antenna control apparatus is preferably entirely or essentially designed in the form of a complete unit or complete module. It can thus be handled and installed without any problems, to be precise not only—as described above—in conjunction with an operating element which is provided outside of the covering housing for the antenna device. In fact, the invention likewise provides for the capability to mount, and if required to retrofit, the complete unit or the complete module as required as a complete module, which can be handled easily and without any problems, underneath the protective cover as well. In this case as well, the antenna control apparatus, which can be retrofitted, is covered with a corresponding operating element underneath the protective cover, in order to use it to set different phase angles for the antennas. One major advantage is thus that the antenna control apparatus according to the invention can be installed easily, as a complete solution, outside or inside the protective cover for the antenna. There is thus no need to install a large number of individual components, possibly even at different points, underneath the protective cover of the antenna, as in the prior art.

It has now been found to be advantageous that the downtilt angle can, in the end, be adjusted both manually and by means of a suitable control apparatus. The complete control unit is omitted for manual operation, so that, in the end, the downtilt angle can be adjusted just by adjusting the operating element, preferably by rotating an adjustment or spindle toothed wheel, by which means the phase shifters, for example, can then be adjusted appropriately via the spindle, which can be rotated, in order to change the downtilt angle.

If an appropriate electronic or electrical control device is retrofitted, then this is preferably installed only outside the protective housing for the antenna. This then interacts directly with the operating transmission element, that is to say in particular with the spindle toothed wheel which is provided for manual adjustment, by which means the spindle toothed wheel can be rotated via the motor drive which is part of the control device.

In addition, it has been found to be advantageous not to provide any limit switches or limit pushbuttons, but limit stops without any clamping. These are therefore provided and constructed on the spindle and fixed to the housing such that the movement of the spindle in each of the extreme or limit positions is prevented from rotating further by an limit stop. The limit stop therefore essentially ensures that no additional releasing forces are required during any subsequent movement in the opposite direction. This makes a contribution to making it possible to use comparatively small motors with low drive ratings.

One preferred embodiment furthermore provides for the control electronics to associate two absolute position values with the two limit stops. The absolute positioning can then be carried out at at least one of these two positions. To do this, the operating element would have to be moved, preferably in the form of the spindle, only in the respective direction until the limit stop was reached. The reaching of the limit stop can likewise be identified and evaluated electrically/electronically by the control electronics.

A self-calibration device provided for the purposes of the invention has been found to be particularly advantageous. If the transmission or control element, preferably in the form of the spindle, is initially moved to at least one of the two limit stops and is then moved back to the other limit stop, then a movement identification process, preferably carried out by counting rotation pulses, can be used to detect the maximum adjustment movement between the two limit stops and this can be associated with a maximum depression angle, while each intermediate angle can be interpolated, possibly also by means of support values stored in a table. It is thus possible to drive in absolute terms any desired positions between the extreme positions.

Alternatively or in addition, it is likewise possible to drive in a relative manner to specific adjustment positions within the permissible adjustment range. For this purpose, the respectively current setting value can be stored in a non-volatile memory in order then to carry out the relative adjustment starting from this value when another requirement for adjustment occurs.

The control apparatus preferably has an external interface. All the adjustment and monitoring functions can be carried out at the command level via this interface. A specific controller or a computer with appropriate control software or else, for example, the base station can be used for drive purposes.

In one embodiment of the invention, the mechanical and the electrical/electronic part of the control apparatus are coupled to one another with a fixed relationship. No specific addressing of the control unit is required to do this. However, the control unit can preferably also operate in a "with addressing" mode. This allows the capability to drive a number of electronic control units from a central point via only one command interface, that is to say to set a number of angles appropriately on different antennas.

Further details, advantages and features can be found in the following text based on the exemplary embodiment which is illustrated in the drawings, in which, in detail:

FIG. 1 shows a schematic extract from a perspective illustration of a mobile radio antenna for a base station. A number of mobile radio antennas, which transmit in different cells, are normally arranged with an appropriate vertical alignment or inclined slightly downward, offset in the circumferential direction, on an antenna mast which is not illustrated in the drawings.

Figure 8:
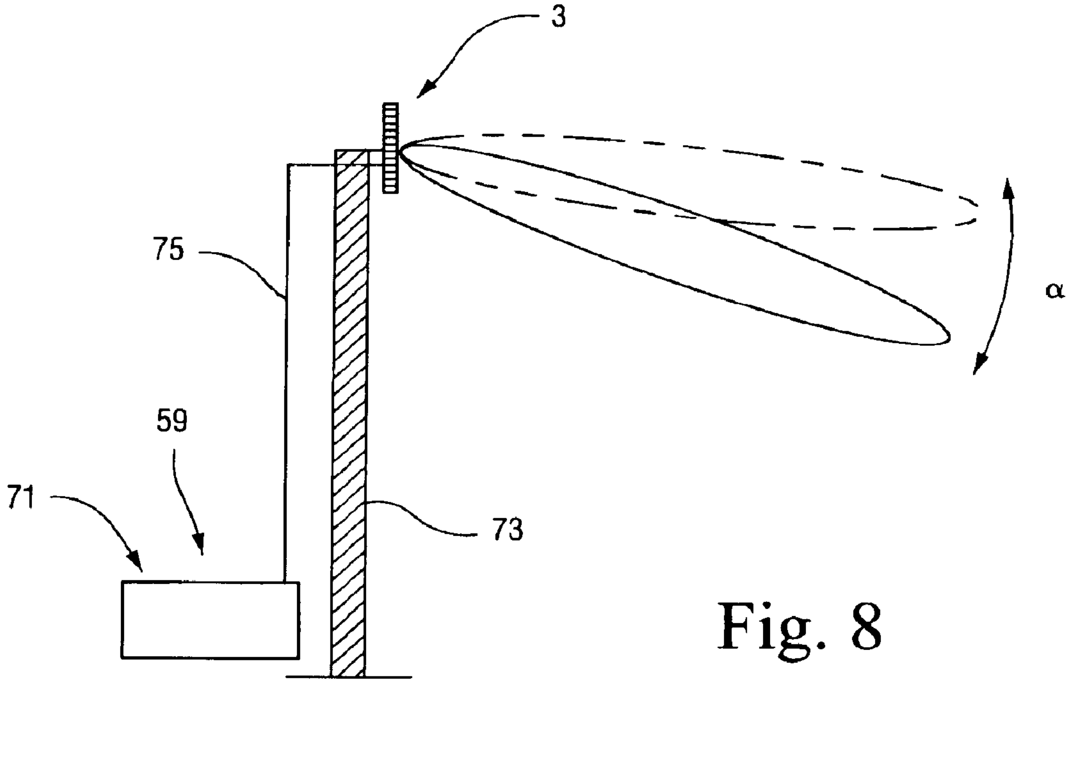
FIG. 8 shows a schematic illustration of a base station with a mast and a mobile radio antenna which can be depressed electronically.

A mobile radio antenna such as this may have a large number of radiating elements, which can transmit in different frequency bands, in which case it is possible to set a different inclination angle, a so-called downtilt angle at which the mobile radio antenna 3 transmits downward with respect to the horizontal, by varying the phase separations between the individual radiating elements 1, which are arranged vertically one above the other. This is done in a known manner via appropriate adjustments of phase shifter elements, and to this extent reference is made to the already known solutions. FIG. 8 in this case shows a base station 71 with an antenna mast 73 on which an appropriate mobile radio antenna 3 is mounted, which is driven via cables 75 from the base station or from the command appliance, and via which the transmission direction can be lowered to a greater or lesser extent electronically over an angle range $\alpha$.

A corresponding mobile radio antenna 3 has, for example, an attachment or mounting plate 5 which, if required, may also have a reflector or at least be fitted with a reflector, with the attachment or mounting plate preferably being provided in [sic] on its face which comes to rest at the bottom with a connecting plate 7, which is provided transversely with respect to it, on which the corresponding connections 9 are provided for connection of coaxial cables for operation of the number of individual radiating elements.

A protective cover 11 consisting of glass-fiber reinforced plastic is furthermore generally attached to the attachment or mounting plate 5, underneath which the individual radiating elements are arranged such that they are located in front of a reflector.

Figure 1:
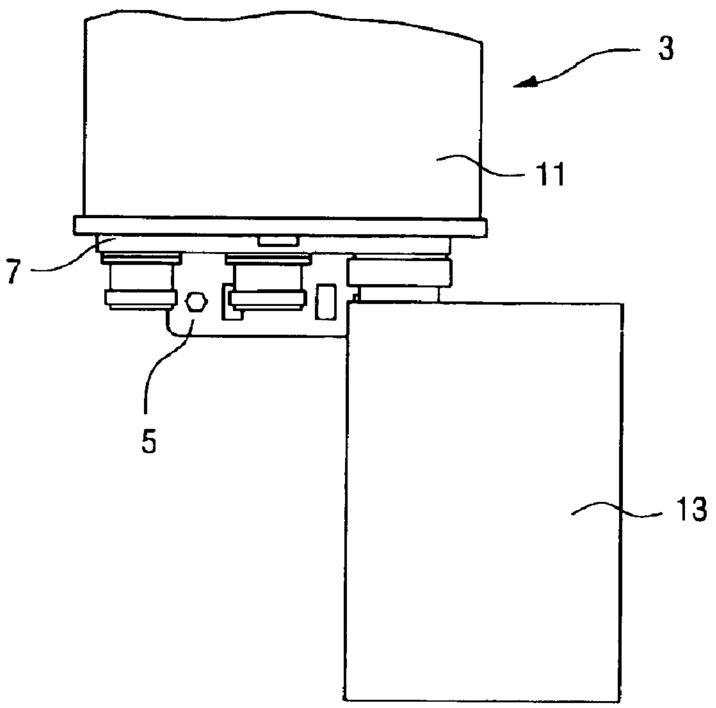
FIG. 1 shows an illustration of a mobile radio antenna, which is arranged underneath a covering or protective housing, and has an externally fitted antenna control apparatus.

The extract of a perspective illustration shown in FIG. 1 also shows the control apparatus 13, which can be retrofitted outside the protective cover 11 and by means of which the beam angle of the antennas can be controlled or set automatically.

Figure 2:
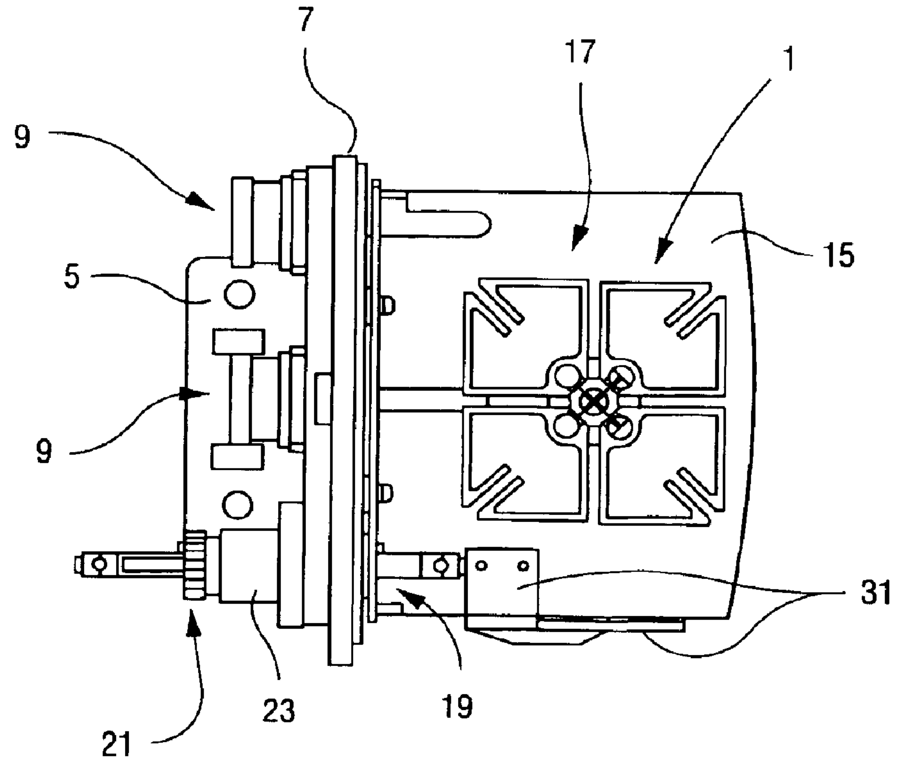
FIG. 2 shows a partial side view of a corresponding mobile radio antenna with the protective housing removed and an operating element passing to the exterior.

Before describing the control apparatus 13, which can be seen in the installed state in FIG. 1, in more detail, reference is first of all made to the schematic plan view in FIG. 2, which shows a first radiating element 17, adjacent to the connecting plate 7, with the protective cover 11 removed and in front of a reflector 15, and seated at its lower end of the reflector, with an operating opening 19 being provided at the side of the connections 9 in the connecting plate 7, to be precise formed by a connecting stub 23 which passes through the connecting plate 7 and is fixedly connected to it in a sealed manner. A threaded sleeve 21 passes through this connecting stub 23, that is to say, in other words, it passes through the corresponding opening 19 in the connecting plate 7. A threaded sleeve 21 is mounted within the stationary connecting stub 23 such that it can rotate about its axial axis but is held such that it cannot move axially. An adjusting element 25 is provided on that section of the connecting sleeve 21 (which is mounted such that it can rotate) that projects outward and, in the illustrated exemplary embodiment, is in the form of a spindle toothed wheel 25'.

An operating element 29 passes through the threaded sleeve 21 and, in the illustrated embodiment, comprises a spindle 29'. The external thread 29" on the spindle 29' interacts with the internal thread on the threaded sleeve 21, that is to say with the internal thread on the spindle toothed wheel 25', so that, depending on the rotation direction, rotation of the spindle toothed wheel 25' results in the spindle 29', which cannot rotate, being moved axially further into the interior of the protective cover 11, or further out.

As can be seen in particular from FIGS. 2 to 5, the inner end of the operating element 29, which is in the form of a spindle 29', is connected to a corresponding transmission device 31 in the form of a transmission linkage, in which case the one phase shifter or the number of phase shifters at the other end of the transmission linkage, which is not shown, can be adjusted in order to change the inclination angle of the antennas. The connection 33 which is provided but cannot rotate furthermore ensures that the spindle 29' cannot itself rotate.

Figure 3:
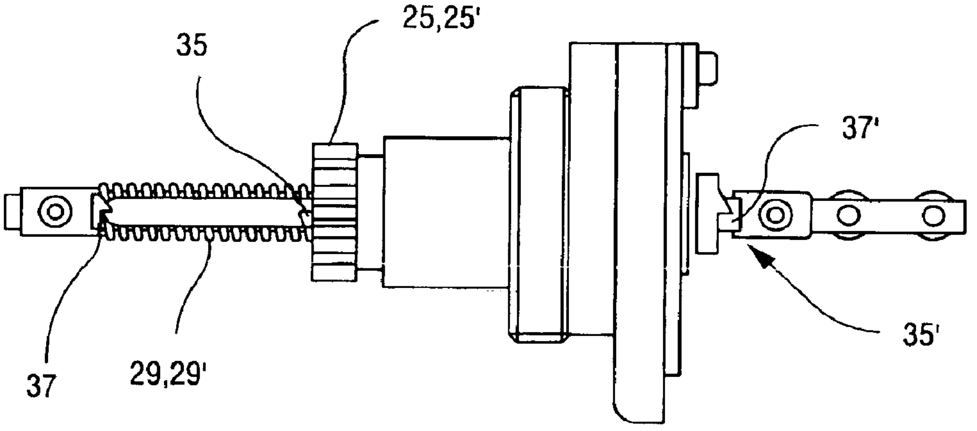
FIG. 3 shows an enlarged detailed view of the mobile radio antenna, which is in principle equipped for manual adjustment capability, for a base station.

The enlarged detail illustration shown in FIG. 3 furthermore shows that the adjusting element 25, which is in the form of the spindle toothed wheel 25', is equipped, on the side pointing outward and offset radially outward with respect to the longitudinal axial axis, with a first operating limit stop 35 and, underneath the protective cover 11, that is to say internally on the connecting plate 7, with a second operating limit stop 35' which is aligned in the opposite sense and is likewise radially offset with respect to the center axis of the spindle. These limit stops are aligned such that they each run in the circumferential direction, and hence in the rotation direction, with the outer adjustment limit stop 25 interacting with the outer operating limit stop 37, which is formed on the spindle 29', and the inner adjusting limit stop 35' interacting with the inner operating limit stop 37', which are likewise aligned in the radial direction. In FIG. 3, the spindle is located in one limit stop position, namely in the position in which it is extended to the maximum extent and in which the two stops 35', 37' rest against one another.

The spindle 29' can thus be moved axially through the connecting plate 7 between two limit positions simply by manual rotation of the spindle toothed wheel 25' until the outer operating limit stop 37 in each case strikes against the outer adjusting limit stop 35 or conversely, the internal adjusting limit stop 35' interacts with the internal operating limit stop 37' on the spindle 29.

The downtilt angle of an antenna such as this can thus be changed and readjusted manually without any problems by rotating the adjusting element 25, that is to say in other words the spindle toothed wheel 25', appropriately in the circumferential direction in order in this way to move the spindle in the axial direction. The phase shifters and hence the downtilt angle can be adjusted appropriately by the interaction with the transmission linkage, which is provided underneath the protective cover.

Furthermore, however, an antenna such as this can be retrofitted without any problems with a control apparatus such as that described in order to depress the mobile radio antenna 3 using a motor, for example by means of remote control.

Figure 4:
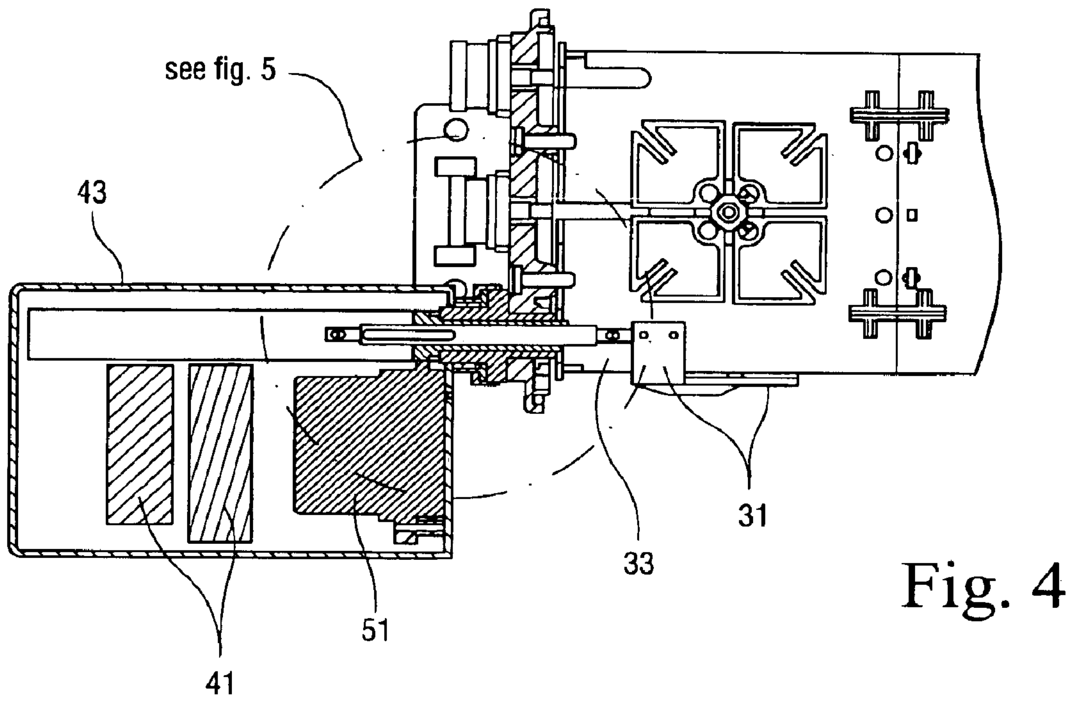
FIG. 4 shows an illustration corresponding to that in FIG. 3, with an antenna control apparatus fitted.
Figure 5:
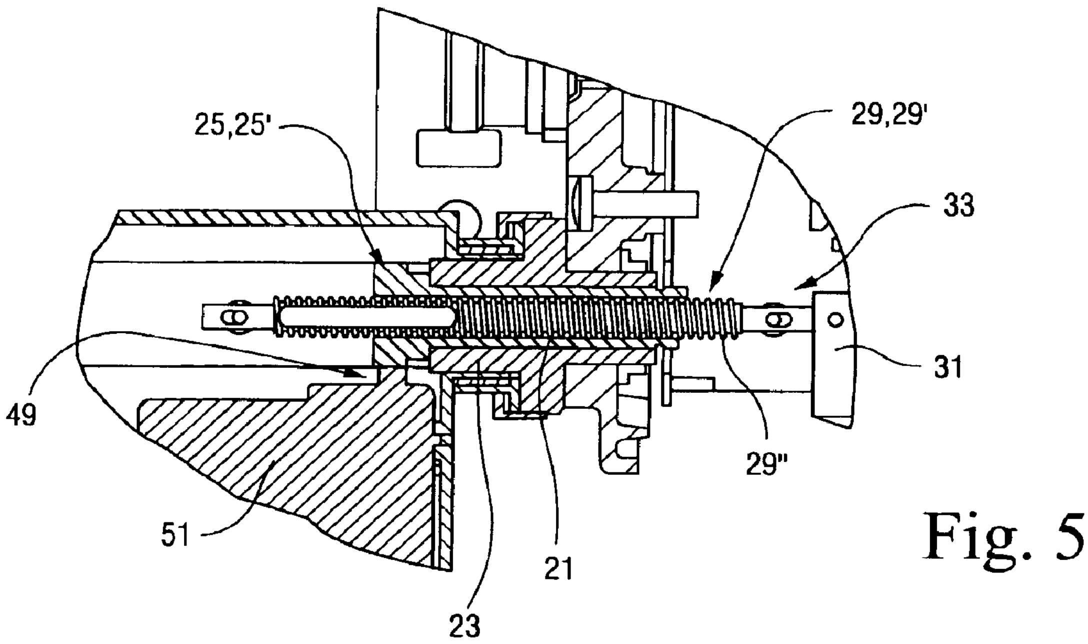
FIG. 5 shows an enlarged illustration of a detail from FIG. 4.
Figure 6:
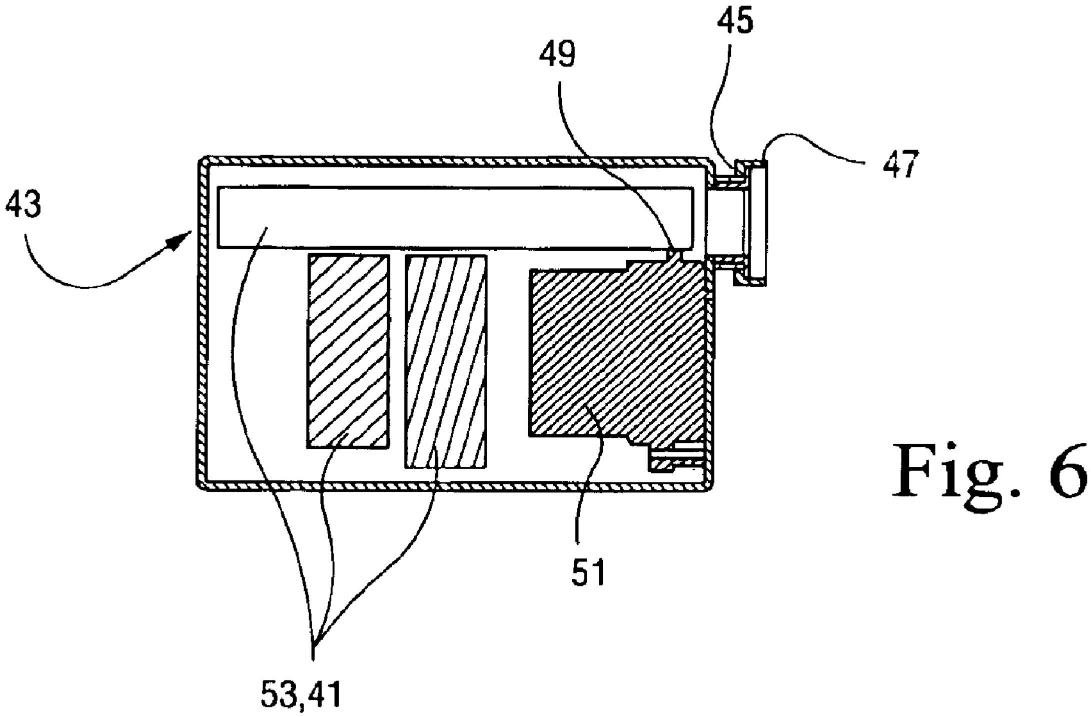
FIG. 6 shows a side view of the retrofitted unit, as shown in FIG. 4, in the removed state, in the form of a schematic cross-sectional illustration.
Figure 7:
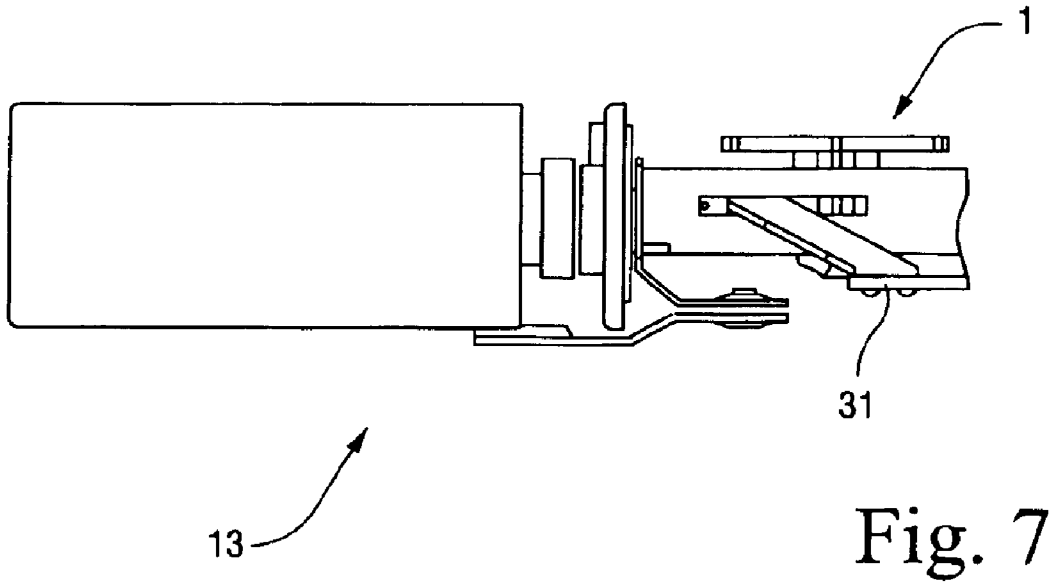
FIG. 7 shows a side view rotated through 90° in comparison to the illustration shown in FIG. 4.

All that is necessary to do this is to retrofit one control apparatus 13, the outside of which has already been shown in FIG. 1, and which is shown in further detail in FIGS. 4 to 6, which can be equipped with the appropriate electrical and/or electronic components and, above all, also contains all necessary drive elements for mechanical adjustment.

For this purpose, the control apparatus 13 (FIG. 6) has a control housing 43 with a connecting stub 45, whose connecting cap ring 47, which is held via the housing 43 and/or the connecting stub 45 and is provided with an internal thread, is screwed firmly to a raised ring section 23' on the connecting stub 23 of the connecting plate 7. The spindle toothed wheel 25' which has been mentioned then comes to rest in the interior of the control housing 43, to be precise immediately alongside a corresponding drive gearwheel 49, which can be driven by an electric motor 51.

As is also evident from the schematic illustrations, the control electronics 41 are provided in the interior of the control housing 43 of the control apparatus 13, together with various control boards 53 which comprise the electrical/electronic components for control purposes, whose operation will be described in the following text.

By way of example, the control apparatus 13 can be operated appropriately via a transmitter (which is not illustrated in any more detail)—since the control apparatus 13 has a receiving device. After initial installation or, for example, after a reset, the electric motor 51 causes the spindle toothed wheel 25', which engages with the drive gearwheel 49 that is driven by the electric motor, to rotate until the spindle 29' has moved to its position where it is inserted to its maximum extent, that is to say it is at its furthest into the protective housing 11, that is to say until the outer adjustment limit stop 35, which is moved with the spindle toothed wheel 25', strikes against the outer operating limit stop 37, which is fitted to the spindle, in the circumferential direction for rotation. The drive motor 51 is then operated in the opposite direction until the inner adjustment limit stop 35', which rotates with the threaded sleeve 21 and with the spindle toothed wheel 25', strike against the inner operating limit stop 37', which is fitted to the spindle and thus moves axially with it. The electronics associate these two limit positions with two angular settings. Moving backward and forward between the limit positions cannot result in blocking since no wedging or bracing forces occur between the limit stops, which effectively run toward one another such that they strike one another at an angle of 90°.

The association of the limit positions with two limit depression angles which are predetermined by the electronics or with two limit depression angles which are transmitted via cable connections (which are not shown in the drawings) or preferably via remotely controllable apparatuses allows the integrated electronics or evaluation electronics, which are provided on one of the control boards 53, to carry out a self-calibration process. Furthermore, between the adjustment movement between the two limit stops, the rotation impulses can be counted, for example, by means of a counting device thus resulting in a signal relating to this that is dependent on the movement. The two limit positions and the signal which is dependent on the movement are then used to allow interpolation by means of the electronics, as a result of which it is possible to drive to any intermediate value between the limit stops. To do this, the controller can calculate the number of rotation impulses required from the desired position for the relevant position, and can drive the electric motor for an appropriate time. Instead of the interpolation process which has been mentioned, the desired intermediate values may possibly also be read from a table, preferably by means of a support values.

The drive may be in the form of an absolute drive, by first of all in each case moving back in the direction of a limit stop and then carrying out a corresponding movement in the opposite direction until the spindle 29' reaches the desired absolute position. However, it can also be carried out as a relative movement in that the most recently set relative value, which corresponds to a specific depression angle of the antenna, is in each case stored, preferably in a non-volatile buffer store. The electronics then calculate what movement distance has been carried out, starting from the current setting, for a next value.

The control apparatus 13 thus has electromechanical control elements, in particular with the electric motor 51, and, furthermore, also control electronics 41 for evaluation, calculation etc. These so-called "intelligent" control electronics 41 preferably have an interface via which all the settings/monitoring functions can be carried out at a command level. A specific controller or a computer with appropriate control software may be used for adjustment. The communication process may be carried out using wires or without wires between a command appliance (for example a computer) and the control apparatus 13, or by the base station itself.

For example, when using a command appliance, it can also drive a number of different control apparatuses 13, provided the individual control apparatuses 13 or the associated control electronics 41 are addressable.

The address modes (with and without an address) may in this case be changed at any time, even during operation. If required, it is also possible to provide for the capability to configure addresses even retrospectively.

The command interface to the control electronics 41 is externally accessible, for example via connectors or cables, or is accessible without the use of wires.

The invention has been described for an antenna control apparatus which can be retrofitted as a complete appliance or as a complete module outside the protective cover for the antenna. With fundamentally the same design, the same appliance may also be installed as a complete appliance or as a complete unit or complete module within the antenna apparatus, that is to say underneath the protective device for the antennas, and in the process can be coupled in the same way or in a comparable way to a transmission device, in order to set different phase angles for the antenna elements. The modular construction or complete construction provides a simple retrofitting capability, without any problems, in both cases.

What is claimed is:

1. A control apparatus for setting a different depression angle, in particular for a mobile radio antenna which is part of a base station, having the following features:

the control apparatus has control electronics, the control apparatus also has an electric motor, the control apparatus can preferably be operated by means of an appliance or command appliance, characterized by the following further features:

the control apparatus is accommodated with its control electronics in a control housing which is separated or isolated from the protective cover for the mobile radio antenna, or consists of a complete unit or complete module, the electric motor of the control apparatus can be coupled to an operating element, which is passed out of the interior, which is covered by the protective cover of the mobile radio antenna via an operating opening or is introduced into the interior of the protective cover via this operating opening, or can be coupled to an operating element which is located under or underneath the protective cover, such that the control elements which are provided in the interior of the protective cover can be operated via this operating element in order to set a different depression beam angle.

2. The control apparatus as claimed in claim 1, characterized in that this control apparatus is provided with an adapter device, by which means the control apparatus can be fitted, in such a manner that it can be retrofitted, to the mobile radio antenna, preferably without opening the protective cover for the mobile radio antenna.

3. The control apparatus of claim 1, wherein the electric motor is provided with a drive wheel in particular with a drive toothed wheel which interacts with an antenna-side adjusting element or toothed wheel, which is arranged outside the protective cover, in order to adjust the operating element.

4. The control apparatus of claim 1, wherein the housing of the control apparatus has an opening by means of which it can be attached or screwed to a connecting plate of a base mounting plate and/or of a protective cover for the mobile radio antenna, to be precise holding the antenna-side adjusting element or toothed wheel, and/or for holding at least part of the associated operating element (in order to carry out an adjustment of the depression angle of the mobile radio antenna.

5. The control apparatus of claim 1, wherein the control electronics allow a self-calibration to be carried out, such that the operating device can be moved by means of the control electronics between two extreme or limit positions by means of the electric motor, such that these limit positions can be associated with maximum and minimum values of the depression level of the mobile radio antenna, and in that the control electronics can interpolate intermediate relative positions between the two extreme or limit positions as a function of the movement.

6. The control apparatus of claim 1, wherein the respective setting value of the operating element and hence a predetermined depression angle of the mobile radio antenna can be stored in a preferably non-volatile memory, and in that the corresponding values can be interpolated.

7. The control apparatus of claim 1 to, wherein the movement-dependent adjustment of the operating element can be carried out in the form of a rotation speed impulse measurement.

8. The control apparatus of claim 1, wherein the control electronics have an interface, via which all the setting and/or monitoring functions can be carried out by a command appliance, a computer or the base station itself.

9. The control apparatus of claim 1, wherein the command appliance is the base station, or is integrated in the base station.

10. The control apparatus of claim 8, wherein the command appliance comprises a computer which processes software, a specific controller, or the base station itself.

11. The control apparatus of claim 1, wherein the respectively currently set depression position of the depression angle can be stored in a non-volatile memory, and in that it is possible to move to a next desired angle relatively from the current value of the downtilt angle.

12. The control apparatus of claim 1, wherein the control apparatus, that is to say in particular the control electronics, is or are addressable, via which a number of control apparatuses can be driven by means of one command appliance in order to set a number of antennas to different depression angles.

13. An antenna, in particular a mobile radio antenna for a base station, having the following features:

the antenna has an adjusting device, which is accessible from outside the protective cover for the mobile radio antenna or can be mounted underneath the protective cover for the mobile radio antenna in order to change a depression angle, the manual adjustment device has an operating element, which is passed through an operating opening in the protective cover or a connecting plate which forms a part of the housing cover for the mobile radio antenna, or which is arranged underneath the protective cover, in the internal area which is shielded by the protective cover, and the depression angle can be set differently, manually, by axial adjustment of the operating element wherein a control apparatus of at least claim 1 can be fitted to the manual adjusting element, preferably in the form of a spindle toothed wheel.

* * * * *